INVENTOR
DONALD W. ROE

United States Patent Office 3,537,890
Patented Nov. 3, 1970

3,537,890
CONDUCTIVE COATINGS OF TIN OXIDES
Donald Winston Roe, Leola, Pa., assignor to RCA
Corporation, a corporation of Delaware
Filed Mar. 3, 1967, Ser. No. 620,324
Int. Cl. H01j 29/28; C23c 11/00; C03c 17/10
U.S. Cl. 117—211                                    10 Claims

ABSTRACT OF THE DISCLOSURE

A process for forming a transparent conductive coating of tin oxides comprising the steps of, passing dry oxygen gas at room temperature into a container having anhydrous liquid stannic chloride therein so as to essentially saturate the oxygen with stannic chloride vapor, mixing this gas stream with a relatively large volume of dry oxygen gas so as to form a diluted gas mixture, passing the relatively cool gas mixture over the surface of the substrate to be coated, said substrate being heated to a temperature of between about 450° C. and 525° C. and said substrate being in a moisture free atmosphere.

BACKGROUND OF THE INVENTION

This invention relates to a method of preparing transparent, electrically conductive coatings on surfaces such as glass and it also relates to electron discharge tubes having such a coating. This invention particularly relates to transparent conductive coatings of tin oxides.

Conductive coatings of tin oxides are known in the art. Prior art methods for applying such a coating on a substrate involve spraying an aerosol mist of a tin compound in an oxidizing medium on the surface of a heated substrate. Typically, a tin halide such as stannic chloride, is dissolved in a methanol solution and sprayed onto the substrate in the presence of air or water vapor. Conductive coatings prepared by these prior art methods are used on the face plates of TV camera tubes, for example, the vidicon, image orthicon, plumbicon, and selenicon tubes. It is desirable that the conductive coating in a TV camera tube be uniform, haze free, highly transparent and free of blemishes. In prior art methods for preparing these coatings, it is difficult to obtain uniform, highly transparent, haze free coatings. Blemishes in the coating occur in manufacture, which impair the resolution and operation of the camera tube and cause a high number of manufacturing rejects. An example of such a blemish is a white spot believed to be formed by the reaction of stannic chloride with the oxidizing gas or water vapor prior to contacting the surface of the substrate. This premature reaction results in the formation of large particles or a dust-like mass of particles which become entrapped in the conductive tin oxides coating. Blemishes of this kind appear as white spots on the TV receiver. Another blemish that often occurs when using the prior art methods are black spots, believed to be due to carbon deposits caused by decomposition of organic materials used in the spraying method. In order to remove a substantial portion of these blemishes, present processes for the manufacture of TV camera tubes such as the vidicon tube, require the step of buffing and washing the surface of the deposited tin oxides coating prior to depositing a semiconductor layer over the tin oxides.

SUMMARY OF THE INVENTION

It has been discovered that haze free, uniform, transparent, conductive coatings of tin oxides on glass or ceramic substrates such as fused silica or sintered alumina can be prepared by: (1) heating the substrate to a temperature between about 450° C. and 525° C. while maintaining the substrate in an essentially moisture free atmosphere (2) passing a dry gas mixture comprised of dry oxygen and anhydrous stannic chloride vapor over a surface of said substrate.

It is preferred that the flow rate of said stannic chloride be less than about 0.005 gram of stannic chloride per second and said gas mixture be held to a temperature at which the gas mixture does not react until it comes in contact with the hot substrate. Preferably, this temperature is about 150° C. or less.

Films made by this process are uniform, haze free, about 6 to 8% more transparent than films made by prior art methods and essentially free of both white spots and black spots. In addition, films made by this process for TV camera tubes need not be buffed and washed prior to depositing the semiconductive target layer thereon. This results in a higher quality camera tube with a lower number of manufacturing rejects which is cheaper to produce than camera tubes having transparent conductive films made by the prior art processes.

DESCRIPTION OF THE PREFERRED EMBODIMENTS

Figure 1:
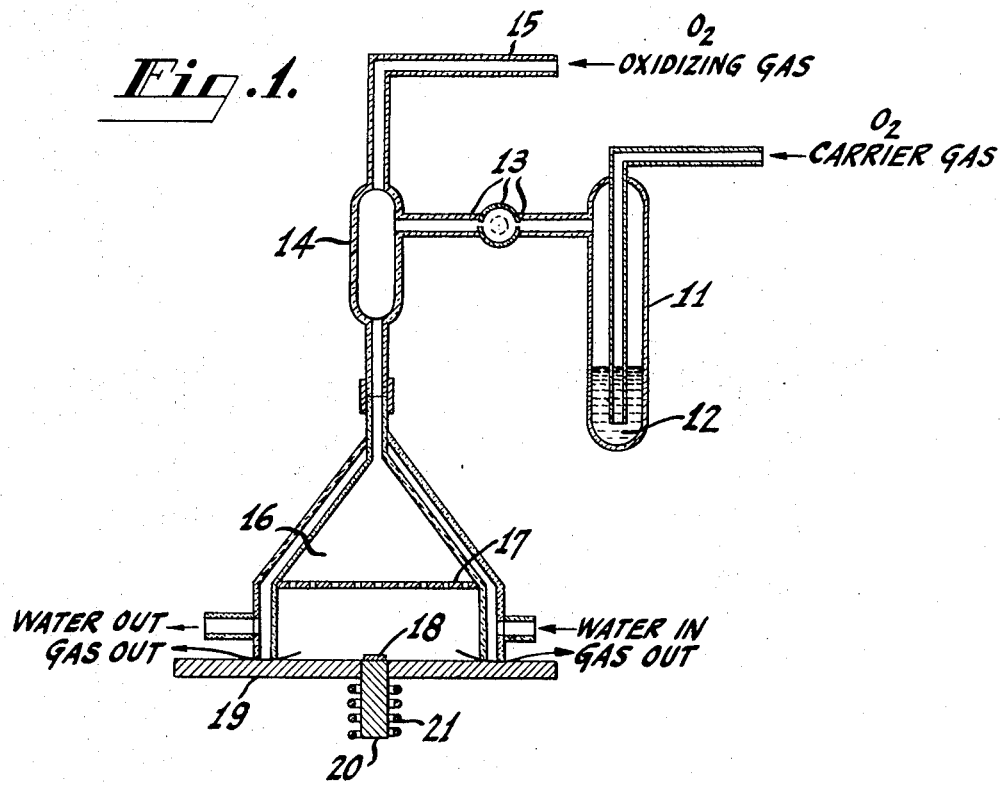
FIG. 1 is a sectional elevational view of an apparatus useful in the practice of this invention.

An apparatus useful for practicing the novel process disclosed herein is shown in FIG. 1. In this apparatus a carrier gas (not shown) is forced into a bubble chamber 11 containing liquid stannic chloride 12. The carrier is bubbled through the stannic chloride 12, carrying with it vapors of the volatile stannic chloride 12. This gas mixture then passes through the tubing and valve assembly 13, into a mixing chamber 14. At the same time an oxidizing gas (not shown) is passed through the oxidizing gas inlet tube 15 into the mixing chamber 14 so as to form a gas mixture which is diluted with respect to the concentration of stannic chloride. This diluted gas mixture then flows into the funnel shaped coating chamber 16, through the porous plate 17 and onto the heated substrate 18. The outer rim of the coating chamber 16 rests on an insulating board 19, the center of which has an aperture through which a metal plug 20 is snugly fit. The substrate to be coated 18, which may be a face plate of a TV camera tube, rests on the metal plug 20 which is at least as large as the substrate 18. The substrate 18 is heated by heating the metal plug 20, for example, by RF heater 21. The walls of the coating chamber are preferably of the type that allows the passage of a fluid therein so as to cool said walls. In FIG. 1 the coating chamber 16 has double walls with a cavity therebetween. The outer wall is provided with two tubular portions through which water enters and leaves the cavity. The unreacted gas and gaseous reaction products escape from around the rim of the coating chamber 16 adjacent the insulating board 19.

The particular coating chamber employed is a water cooled porcelain Buchner funnel which is inverted so as to rest on an asbestos insulating board.

The Vidicon faceplate 18 to be coated is made of Corning No. 7056 glass. This glass has a softening temperature of about 525° C. The faceplate 18 which is typically about one inch in diameter, is positioned on top of the metal plug 20. The coating chamber 16 is then inverted over the faceplate 18 and plug 20 and allowed to rest on the insulating board 19. The coating chamber 16 is then flushed with dry oxygen gas flowing at a rate of about 8 cubic feet per hour through the oxidizing gas inlet tube 15. During this time the faceplate 18 is heated to a temperature of about 400° C. and water is caused to flow around the walls of the coating chamber 16 so as to cool said walls. After approximately ten minutes the temperature at the surface of the faceplate is brought to about 515° C. At that time, dry oxygen carrier gas is passed through the liquid stannic chloride 12 at a rate of about two cubic feet per hour and at room temperature. The oxygen carrier gas becomes saturated with stannic chloride vapors so as to provide about 0.005 gram of stannic chloride vapor per second. This carrier gas stream of oxygen and stannic chloride vapor is then brought together in a mixing chamber 14 with the oxidizing gas stream which was used to flush the coating chamber 16. From the mixing chamber 14, the diluted gas mixture is passed into the coating chamber 16 and over the surface of the hot faceplate 18 where a coating of conductive tin oxides is formed. Coating is carried out for about ten seconds and is stopped after this time by shutting off the flow of carrier gas. The oxidizing gas stream is maintained for an additional minute in order to insure complete flushing of the stannic chloride vapor from the coating chamber 16. The coating chamber 16 is then opened and the faceplate 18 is removed and allowed to cool. The resistivity of the resulting tin oxides coating on the faceplate is about 1,000 ohms per square.

EXAMPLE 2

The same procedure is followed as described in Example 1 except that the faceplate surface temperature during coating was held at 500° C. The resistivity of the resulting tin oxides coating was 1,500 ohms per square.

EXAMPLE 3

The glass faceplate 18 used in this example is made of Corning 0080 glass. This glass has a softening temperature of about 490° C. The coating procedure is the same as that described in Example 1 except that during the initial flushing process the faceplate 18 is held at 300° C. and during the coating steps the temperature of the surface of the faceplate 18 is held at 475° C. Also coating time in this instance is 15 seconds. The resistivity of the resulting tin oxides coating is 2,000 ohms per square.

EXAMPLE 4

The same procedure as described in Example 3 is followed with the exception that the faceplate surface temperature is held at 465° C. during coating. The resistivity of the resulting tin oxides coating is 15,000 ohms per square.

EXAMPLE 5

The same procedure as described in Example 3 is repeated with the following exceptions:
(a) The temperature of the faceplate surface is held at 485° C. during coating; and
(b) the rate of flow of oxygen carrier gas through the stannic chloride is one cubic foot per hour. The resistivity of the resulting tin oxides coating is 3,000 ohms per square.

Tables 1 and 2 list the optimum and preferred range of parameters for coating Corning glass types 7056 and 0080.

TABLE 1.—OPTIMUM COATING CONDITIONS FOR CERTAIN GLASS FACEPLATES

| Glass type | Temp.,° C. of surface to be coated | Flow rate of carrier gas, ft.³/hr. | Flow rate of O₂ oxidizing gas, ft.³/hr. | Coating time, seconds | Resistivity of tin oxides coating Ω/sq |
|---|---|---|---|---|---|
| Corning 7056 (Hard glass) | 515°±10° | 2±10% | 8±10% | 10±1 | ~2,000 |
| Corning 0080 (Soft glass) | 475°±10° | 2±10% | 8±10% | 15±1 | ~2,000 |

TABLE 2.—PREFERRED RANGE OF COATING CONDITIONS FOR CERTAIN GLASS FACEPLATES

| | Corning 7056 glass | Corning 0080 glass | Effect of conditions outside preferred range. |
|---|---|---|---|
| Temp. of glass, ° C. | 480–525 | 450–490 | Non-uniform, spotty. |
| Flow rate of O₂ carrier gas, ft.³/hr | 1/3–4 | 1–4 | High resistivity, non-uniform, cloudy. |
| Flow rate of O₂ oxidizing gas ft.³/hr. | 4–10 | 3–10 | Peeling, cloudy, non-uniform. |
| Coating time, seconds | 5–25 | 5–60 | High resistivity heavy coating, cloudy, peeling. |

The preferred maximum concentration of stannic chloride in the gas mixture is about 5 grams $SnCl_4$ per cubic foot of gas mixture. However, the optimum maximum concentration of stannic chloride in the gas mixture is about 3 grams $SnCl_4$ per cubic foot of gas mixture in the case of the 7056 type glass and about 3.5 grams $SnCl_4$ per cubic foot of gas mixture in the case of the 0080 type glass.

The optimum resistivity of the conductive coatings for use in TV camera tubes is about 10,000 ohms per square or less. However, coatings having resistivities of up to about 20,000 ohms per square are useable. The optimum coating temperature depends upon the softening point of the particular substrate. The temperature should not be above the softening point of the substrate but is preferably near that point if maximum adhesion of the conductive coating on the substrate is desired.

It is important to maintain the gas mixture at a temperature at which stannic chloride and oxygen will not react to form tin oxide prior to coming in contact with the heated faceplate. The preferable maximum temperaable is about 150° C. The gas mixture may be kept at or below this temperature by cooling the walls of the coating chamber and/or mixing chamber. It is also preferable to use an insulating material for the base, to provide a porous separator between the upper portion of the coating chamber and the lower portion of the coating chamber and to use a rapid rate of flow of the reaction gas mixture. It is preferred to use a flow rate that the coating chamber is flushed about every 10 seconds.

The gas mixture should not be cooled to a temperature below which the stannic chloride vapor or residual water vapor in the gas, would condense. Typically, the dew point of the oxidizing and carrier gases is about −40° C. or less. This represents a water content of about 0.01% or less as compared to a water content of at least about 2.5–3% under prior art coating conditions.

It should be noted that although it is preferable to use pure oxygen as the oxidizing gas and as the carrier gas, these gases may be mixed with an inert gas such as nitrogen, or the carrier gas may be comprised of an inert gas alone.

An important factor in preventing a heavy mist or large particles of tin oxides to form, which may then become entrapped in the conductive coating, is the low concentration of stannic chloride used in this process.

Figure 2:
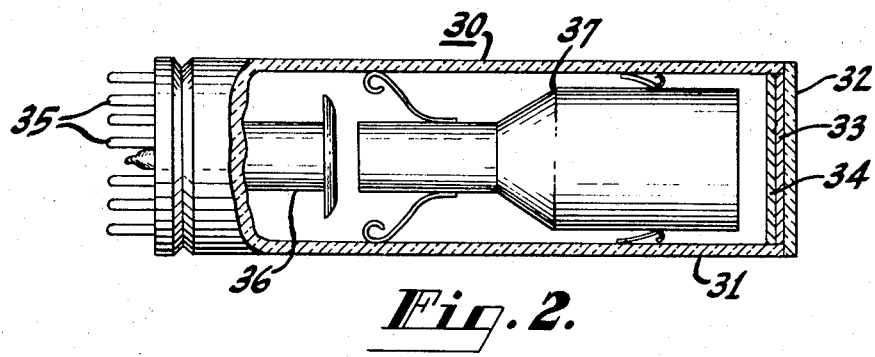
FIG. 2 is a partially cross-sectional side view of a vidicon camera tube indicating the position of the conductive coating in the tube.

FIG. 2 is a partially sectional side view of a vidicon type TV camera tube including a layer of the novel tin oxides conductive coating on the faceplate thereof. The vidicon tube 30 is comprised of an elongated evacuated envelope 31 which may be made of glass for example. At one end of the envelope 31 is a glass faceplate 32. The faceplate 32 is sealed across one end of the envelope 31 by suitable means known in the art. On the inner surface of the faceplate 32 is a novel transparent conductive layer 33 of tin oxide made by the novel process disclosed herein. Over the conductive layer 33 is a thin photo-conductive layer 34. The other end of the tube 30 terminates in contact prongs 35. Adjacent the end having the contact prongs 35 is mounted an electron gun assembly 36. Between the photo-conductive layer 34 and the gun assembly 36 is mounted an elongated focusing electrode 37.

What is claimed is:
1. A method for producing a transparent electrically conductive coating on a surface which comprises the steps of
 (1) heating the surface to a temperature between about 450° C. and 525° C. while maintaining the substrate in an essentially moisture free atmosphere,
 (2) passing a dry gas mixture over said heated surface, said gas mixture being selected from the group consisting of
  (a) dry oxygen and anhydrous stannic chloride vapor, and
  (b) dry oxygen, anhydrous stannic chloride vapor and an inert carrier gas, and
 (3) maintaining said gas mixture prior to its contact with said heated surface at a temperature to prevent reaction of said gas mixture while maintaining the temperature of said surface at 450° C.–525° C. during formation of said coating thereon.

2. The method described in claim 1 wherein said gas mixture is produced by combining gas streams, a first gas stream passing through a chamber containing pure anhydrous stannic chloride so as to include stannic chloride vapor in said first gas stream, and then combining said first gas stream with a dry oxidizing gas stream having a flow rate of at least four times the rate of flow of said first stream so as to produce said gas mixture.

3. A process for producing a transparent, haze free, electrically conductive coating on a glass substrate comprising the steps of (1) heating said glass substrate to a temperature between 450° C. and 525° C. while maintaining said glass substrate in an essentially moisture free atmosphere, (2) passing a dry gas mixture over the surface of said glass substrate, said gas mixture selected from the group consisting of (a) dry oxygen and anhydrous stannic chloride vapors and (b) dry oxygen, anhydrous stannic chloride and an inert carrier gas, the flow rate of said stannic chloride being less than about 0.005 gram of stannic chloride per second while (3) maintaining said gas mixture prior to its contact with said heated surface at a temperature at which the gases of said mixture will not chemically react until they contact said substrate which is maintained at a temperature of 450° C.–525° C. during formation of said coating thereon.

4. A process for the production of a transparent, haze free, electrically conductive coating on a glass surface in an electron discharge tube comprising (1) heating said glass surface to a temperature of between 450° C. and 525° C. while maintaining said glass in an essentially moisture free atmosphere, (2) passing a dry oxidizing gas mixture consisting of anhydrous stannic chloride vapors together with a gas selected from oxygen and oxygen plus an inert dry carrier gas, over the surface of said glass, the concentration of stannic chloride in said oxidizing gas mixture being less than about 5 grams of stannic chloride per cubic foot of gas mixture, and (3) maintaining said gas mixture at a temperature at which the mixture does not react until it comes in contact with said heated glass surface, the temperature of said heated glass surface being maintained at 450° C.–525° C. during formation of said coating.

5. The method described in claim 4 wherein said oxidizing gas mixture consists of stannic chloride and oxygen.

6. The method described in claim 4 wherein the flow rate of the gas mixture is adjusted so as to cause essentially the entire replacement of the gas mixture in the coating chamber about every 10 seconds.

7. A television camera tube comprising an envelope, a target within said envelope, means for directing an electron beam toward said target, said target comprising a conductive coating on a glass substrate and a semiconductor layer on said conductive coating, wherein the improvement comprises a conductive coating prepared by the method described in claim 4.

8. A method of providing a transparent, haze free, conductive coating on the surface of a glass based target of a television camera tube comprising the steps of (1) placing the glass base in a moisture free coating chamber, (2) heating and maintaining during coating the surface of the glass base to a temperature less than or at the softening temperature of the glass, said temperature being between 450° C. and 525° C., (3) passing a dry gas mixture of dry oxygen and anhydrous stannic chloride over said heated glass base, said gas mixture being formed by (a) causing a first gas stream to flow through a container having anhydrous stannic chloride therein, so as to absorb less than about 0.005 gram of stannic chloride per second, said first gas stream selected from the group consisting of oxygen and inert carrier gas, then, (b) combining the resultant gas stream with a large volume of an oxidizing gas stream so as to form the gas mixture, said gas mixture being maintained at a temperature of less than 150° C. until contacting the heated surface of the glass base.

9. The method of claim 8 wherein (1) the glass base softens at about 525° C. and is heated to a temperature between about 505° C. and 525° C. (2) said first gas stream consists of dry oxygen (3) the oxidizing gas is dry oxygen (4) the flow rate of said first gas stream is between about ⅓ and 4 cubic feet per hour (5) the flow rate of oxidizing gas is between about 4 and 10 cubic feet per hour and (6) the coating time is between about 5 and 25 seconds, and (7) the concentration of stannic chloride in the gas mixture is less than about 3 grams of stannic chloride per cubic foot of gas mixture.

10. The method of claim 8 wherein (1) the glass base softens at about 490° C. and is heated to a temperature between about 465° C. and 485° C., (2) said first gas stream and oxidizing gas are dry oxygen, (3) the flow rate of said first gas stream is between about 1 ft.³/hr. and 4 ft.³/hr., (4) the flow rate of oxidizing gas is between about 3 ft.³/hr. and 10 ft.³/hr., (5) the concentration of $SnCl_4$ in the gas mixture is less than about 3.5 grams of $SnCl_4$ per cubic foot of gas mixture, and (6) the coating time is between about 5 seconds and 1 minute.

References Cited

UNITED STATES PATENTS

| 2,898,496 | 8/1959 | Clark. | |
|---|---|---|---|
| 3,005,731 | 10/1961 | Payne | 117—229 X |
| 3,088,850 | 5/1963 | Brichard et al. | 117—211 |

ALFRED L. LEAVITT, Primary Examiner

A. GRIMALDI, Assistant Examiner

U.S. Cl. X.R.

117—106, 229; 313—92